United States Patent
Kolhammer et al.

(10) Patent No.: US 6,428,652 B1
(45) Date of Patent: Aug. 6, 2002

(54) PROCESS FOR LAMINATING TEXTILE SHEET MATERIALS ONTO MOLDABLE FOAM OR ONTO FOAMED MOLDINGS

(75) Inventors: Klaus Kolhammer, Marktl; Claudia Schmidt, Altoetting; Abdulmajid Hashemzadeh, Burgkirchen; Doris Bauer, Munich, all of (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 09/495,533

(22) Filed: Jan. 31, 2000

(30) Foreign Application Priority Data

Feb. 26, 1999 (DE) .......................... 199 08 486

(51) Int. Cl.$^7$ ............................... B32B 31/00
(52) U.S. Cl. ................. 156/283; 264/45.4; 442/370; 526/317.1; 526/318.2
(58) Field of Search ............... 442/370; 526/317.1, 526/318.2; 264/45.4; 156/283

(56) References Cited

U.S. PATENT DOCUMENTS

| | | | | |
|---|---|---|---|---|
| 2,732,324 A | * | 1/1956 | Morris | 156/283 |
| 3,654,213 A | * | 4/1972 | Christenson et al. | 526/317.1 |
| 4,185,050 A | * | 1/1980 | Lazear et al. | 526/318.2 |
| 4,283,457 A | * | 8/1981 | Kolsky et al. | 440/370 |
| 4,729,917 A | * | 3/1988 | Symara et al. | 442/370 |
| 5,037,700 A | * | 8/1991 | Davis | 156/326 |
| 5,886,121 A | | 3/1999 | Kinkel et al. | |

FOREIGN PATENT DOCUMENTS

| | | | |
|---|---|---|---|
| CA | 2047765 | 1/1992 | |
| DE | 4242059 | 3/1994 | |
| DE | 19718315 | 11/1998 | |
| EP | 0290667 | 11/1988 | |
| EP | 0470928 | 2/1992 | |
| EP | 0 623 491 | 11/1994 | |
| EP | 0 710 578 | 5/1996 | |
| GB | 990728 | * 4/1965 | ........ 156/283 |
| GB | 1329094 | * 9/1973 | ........ 264/45.4 |
| WO | 86/07010 | 12/1986 | |
| WO | 91/03376 | 3/1991 | |
| WO | 94/20661 | 9/1994 | |
| WO | 94/20661 | 11/1994 | |

OTHER PUBLICATIONS

T.G. Fox, Bull, Am. Physics Soc. 1, 3 p. 123 (1956).
Polymer Handbook 2$^{nd}$ Edition, F. Wiley & Sons, New York (1975).
Derwent Abstract corresponding to EP 0623491 (AN 1994–343178).
Derwent Abstract corresponding to EP 0710578 (AN 1996–223340).
Derwent Abstract corresponding to WO 94/20661 (AN 1994–280617).
Patent Abstracts of Japan, vol. 016, No. 466 (C–0989) Sep. 28, 1992 Corresponding to JP04 164 984.
Patent Abstracts of Japan, vol. 1995, No. 10, Nov. 30, 1995, Corresponding. to JP07 179835.
English Derwent Abstract AN 1994–066894 [09] Corresponding. to DE 42 42 059.
English Derwent Abstract AN 1998–584528 [50] Corresponding to DE 197 18 315.

* cited by examiner

Primary Examiner—John J. Gallagher
(74) Attorney, Agent, or Firm—Brooks & Kushman P.C.

(57) ABSTRACT

The invention provides a process for laminating textile sheet materials onto moldable particle foam or onto foamed moldings, using, as an adhesive, a polymer composition based on copolymers of one or more monomers selected from the group comprising vinyl esters, acrylates, methacrylates, vinylaromatics and vinyl chloride and from 0.01 to 25% by weight, based on the total weight of the copolymer, of one or more ethylenically unsaturated monomers containing carboxyl groups.

5 Claims, No Drawings

PROCESS FOR LAMINATING TEXTILE SHEET MATERIALS ONTO MOLDABLE FOAM OR ONTO FOAMED MOLDINGS

BACKGROUND OF THE INVENTION

1. Field of the Invention

The invention relates to a process for laminating textile sheet materials onto moldable particle foam or onto foamed moldings, using a polymer composition as an adhesive.

2. Background Art

The trend toward increasingly lightweight components for use in motor vehicles and aircraft, and also in products for sport and leisure, has led to the development of foamed moldings with high mechanical stability and the greatest possible reduction in weight. To produce these foamed moldings, successful use has been made of materials such as expandable polystyrene (EPS) or expandable compositions based on EPS and polyphenylene oxide (PPO). The latter is available, for example, with the trade name Noryl® EF (registered trademark of General Electric Co. USA).

These compositions, such as EPS, EPE (expandable polyethylene) and EPP (expandable polypropylene) can be foamed with steam in suitable molds to give the desired moldings. This process known per se permits convenient production of moldings for interior automotive trim, for example door paneling, side-impact cushioning, knee cushioning, cores for headrests, sun visors and parcel shelves, and also for external applications, such as bumpers. Examples of applications unrelated to motor vehicle construction are sports products, such as surfboards.

However, some of the applications listed above cannot be exploited using the foamed parts by themselves. High requirements—for example for visual quality or for a high minimum level of dimensional stability and also low thermal expansion—mean that the foamed moldings have to be coated with an outer skin.

The usual flexible films are used here, with or without a foam backing, and in particular textiles or fiber webs. The latter are permeable to water vapor and are placed into the appropriate molding tool prior to B the actual foaming-on procedure. A process of this type is termed in-mold skinning and is described, for example, in the GE Plastics brochure Noryl® EF Profile (page 19). To provide adhesion here between the foam and the fiber web, use is made of hot-melt adhesives, the activation temperature of which must not be higher than the glass transition temperature of the foam material. Using these adhesives it is not, of course, possible to obtain high heat resistance in the laminates, in particular above 80° C. (since the adhesives soften).

EP-A 623491 has disclosed a material for automotive bodywork paneling components, composed of a foam core enclosed in a tube. The tube here is adhesive-bonded to the foam core or secured to it using heat.

Another in-mold skinning process for a door-paneling support is described in EP-A 710578. Here, a glass-fiber mat is placed into the molding tool prior to the actual foaming process, and the expanding foam is foamed onto a glass web without the need for any binder. However, this process, too, gives unsatisfactory strength of the glass-web/foam bond at temperatures above 80° C.

SUMMARY OF THE INVENTION

Since the automotive industry typically requires resistance to temperatures of 80° C. and above for support systems of this type and for self-supporting moldings, the object on which this invention is based was to provide a process which can bond textile sheet materials, preferably glass webs, durably, and with good heat-resistance, to moldable foam and to the resultant foamed moldings. To avoid unnecessary operations and the costs associated with these, application of the binder system to the glass web to be laminated should preferably precede in-mold skinning, but the system should not be activated until the foaming procedure takes place.

The invention provides a process for laminating textile sheet materials onto moldable particle foam or onto foamed moldings, using, as an adhesive, a polymer composition based on copolymers of one or more monomers selected from the group comprising vinyl esters, acrylates, methacrylates, vinylaromatics and vinyl chloride and from 0.01 to 25% by weight, based on the total weight of the copolymer, of one or more ethylenically unsaturated monomers containing carboxyl groups.

DESCRIPTION OF THE PREFERRED EMBODIMENTS

Suitable copolymers containing carboxyl groups are those based on one or more monomers selected from the group comprising vinyl esters of unbranched or branched alkylcarboxylic acids having from 1 to 15 carbon atoms, methacrylates and acrylates of alcohols having from 1 to 10 carbon atoms, vinylaromatics, such as styrene, and vinyl chloride. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched mono-carboxylic acids having from 5 to 11 carbon atoms, for example VeoVa5® (Shell Company) and VeoVa9®. Preferred methacrylates and acrylates are methyl acrylate, methyl methacrylate, ethyl acrylate, ethyl methacrylate, propyl acrylate, propyl methacrylate, n-butyl acrylate, n-butyl methacrylate and 2-ethylhexyl acrylate.

Preferred copolymers containing carboxyl groups are those of vinyl acetate, if desired with other vinyl esters, such as VeoVa9®; of vinyl chloride, if desired with vinyl acetate; copolymers of vinyl acetate with methacrylates or with acrylates; copolymers of methacrylates and/or acrylates; and particularly preferably copolymers of styrene and the acrylates mentioned, in each case containing from 0.01 to 25% by weight of monomer units containing carboxyl groups.

Suitable ethylenically unsaturated monomers containing carboxyl groups are ethylenically unsaturated mono- or dicarboxylic acids, such as acrylic acid, methacrylic acid, maleic acid, fumaric acid and itaconic acid. The content of comonomer units containing carboxyl groups is preferably from 0.01 to 15% by weight, based on the total weight of the copolymer.

If desired, the copolymers may also contain from 0.01 to 10.0% by weight, based on the total weight of the copolymer, of comonomers selected from the group consisting of ethylenically unsaturated carboxamides, preferably acrylamide, selected from the group consisting of ethylenically unsaturated sulfonic acids and salts of these, preferably vinylsulfonic acid, selected from the group consisting of comonomers with more than one ethylenic unsaturation, for example divinyl adipate, diallyl maleate, allyl methacrylate or triallyl cyanurate, and/or selected from the group consisting of N-methylol(meth)acrylamides and ethers of these, such as isobutoxy or n-butoxy ethers.

In a particularly preferred embodiment, the copolymers contain in each case from 0.01 to 10% by weight of acrylic acid and/or methacrylic acid, if desired, combined with from 0.01 to 2% by weight of acrylamide.

The composition of the copolymer is preferably selected to give a glass transition temperature Tg or a melting point of above 30° C., preferably from 55 to 150° C. The glass transition temperature Tg and the melting point of the polymers may be determined in a known manner using differential scanning calorimetry (DSC). The Tg may also be approximated using the Fox equation. According to T. G. Fox, Bull. Am. Physics Soc. 1, 3, page 123 (1956): $1/Tg = x_1/Tg_1 + x_2/Tg_2 + \ldots + x_n/Tg_n$, where $x_n$ is the fraction by weight (% by weight/100) of the monomer n and $Tg_n$ is the glass transition temperature in degrees Kelvin of the homopolymer of the monomer n. Tg values for homopolymers are listed in Polymer Handbook 2 nd Edition, J. Wiley & Sons, New York (1975).

The weight-average molecular weight Mw is preferably from 10,000 to 400,000, particularly preferably from 60,000 to 300,000. The molecular weight and the molecular weight distribution may be adjusted in a known manner during the polymerization, for example, by using chain transfer agents and via the temperature of polymerization, and can be measured using gel permeation chromatography (GPC).

The copolymers are prepared in a manner known per se, preferably by emulsion polymerization, as described, for example, in WO-A 94/20661, the relevant disclosure of which is incorporated into the present application by way of reference. The form in which the copolymer is present in the polymer preparation may be as an aqueous dispersion, in solution or as a powder. Preference is given to polymer powders and pulverulent polymer preparations. To prepare the powders, the polymer dispersion which can be obtained by emulsion polymerization is dried. The drying may be by spray drying, freeze drying or roll drying, or by coagulation of the dispersion followed by fluidized-bed drying. Spray drying is preferred. It is preferable for the copolymer to be prepared and dried without adding any protective colloid.

The polymer composition may also comprise crosslinkable compounds, if the heat-resistance demanded by the user makes this necessary. These are preferably compounds which can enter into durable covalent or ionic bonding with the abovementioned carboxylic acid groups. Preference is given here to crosslinking components capable of entering into covalent bonding with carboxylic acid groups. They preferably contain in each molecule at least two of the functional groups in the following list: epoxides, organohalogen compounds, aziridines, carbodiimides, oxazolines, alcohols, amines, aminosilanes, aminoformaldehydes and isocyanates. Preference is also given to polyfunctional N,N,N',N'-tetrakis(2-hydroxyalkyl)adipamides (Primid products).

Preference is given here to solid, pulverulent compounds which have two or more epoxy or isocyanate groups, with a melting point of from 40 to 150° C. The crosslinking agents usually used melt below the glass transition temperature of the polymer foam. Examples of suitable epoxy crosslinking agents are those of the bisphenol A type, i.e., condensation products of the bisphenol A and epichlorohydrin or methylepichlorohydrin, and also triglycidyl isocyanurate (TGIC). Epoxy crosslinking agents of this type are available commercially, for example under the trade names Epikote or Eurepox. Suitable diisocyanates are likewise products which are readily commercially available, for example tetramethylxylene m-diisocyanate (TMXDI) and methylenediphenyl diisocyanate (MDI). The content of crosslinking agent is generally from 0.1 to 25% by weight, preferably from 4 to 12% by weight, based on the pulverulent copolymer.

In the process of the present invention for the adhesive bonding of textile sheet materials onto moldable polymer foam, the polymer preparation, preferably a polymer powder composition is applied to the textile sheet material. The textile sheet materials may be textiles, fibers, yarns, mats, wovens or scrim. The fiber material should be suitable for reinforcing the foamed molding and is preferably composed of hard fibers, such as glass fiber, carbon fiber or aramid fiber. Preference is given to glass-fiber mats and glass-fiber webs. However, it is also possible to use textile sheet materials coated on one side with a thermoplastic polymer, such as polyethylene, polypropylene or polyester. The polymer composition is then applied to the uncoated side of the textile sheet material. The amount of binder necessary for adhesive bonding (based on solids) generally varies from 1 $g/m^2$ to 1000 $g/m^2$, and amounts of from 10 to 250 $g/m^2$ are preferred. More particularly, preferred amounts of binder are from 25 to 100 $g/m^2$.

If desired, once the polymer composition has been applied, it may be fixed (sintered) on the textile sheet material at an elevated temperature, generally from 150 to 180° C. The textile sheet material pretreated in this way is then placed into a suitable molding tool. It is also possible, however, to place the textile sheet material into the mold first and then apply, and if desired, sinter-on the polymer preparation.

The polymer beads to be foamed are introduced into the molding tool and preferably expanded using superheated steam, whereupon the foam is foamed against the textile sheet material provided with the polymer preparation. The molded foam here is composed of expanded polystyrene (EPS), an expanded composition composed of EPS and polyphenylene oxide (EPS/PPO) (trade name Noryl EF from GE Plastics or Caril® from Shell), of expanded polyethylene (EPE) or of expanded polypropylene (EPP). Preference is given to EPS and EPS/PPO compositions, and the latter are very particularly preferred. After the foaming procedure, the molding laminated to the textile sheet material is removed from the mold. If desired, the molding may then be thermally post-treated to remove residual gases or to produce its final dimensional stability and final dimensions. This post-treatment preferably takes place within a temperature range of from 60 to 110° C.

In addition to the in-mold skinning process version described above, it is also possible to laminate ready-foamed moldings made from the abovementioned materials (EPS, EPS/PPO, EPE or EPP) to textile sheet materials. For this, the polymer composition applied to a textile sheet material or to a ready-foamed molding and, if desired, sintered-on under the temperature conditions given above. The textile sheet material is then laminated onto the ready-made molding, using a pressure higher than ambient and an elevated temperature, preferably at a pressure of from 0.1 to 30 bar and at a temperature of from 80 to 150° C., either in an appropriate molding tool or outside the mold used for the foaming. If desired, this version of the process may also include a thermal post-treatment of the molding, under the preferred conditions given above, to remove residual gases and to produce the final dimensional stability and final dimensions.

In the version which is very particularly preferred, the polymer composition is applied to a glass-fiber web. The application preferably takes place onto the product in roll form, using powder-scattering equipment or an electrostatic spraying process. This is followed by sintering onto the glass-fiber web at from 150 to 180° C. This web is then tailored to the requirements of the molding and placed into the molding tool An expandable composition composed of polystyrene and polyphenylene oxide (EPS/PPO) is then foamed in the mold, against the glass web, using superheated steam. If desired, degassing at from 80 to 100° C. may also take place after removal from the mold.

The invention also provides laminated products made from molded particle foam and a textile sheet material laminated onto this, bonded using a polymer based on copolymers of one or more monomers selected from the group comprising vinyl esters, acrylates, methacrylates, vinylaromatics and vinyl chloride and on from 0.01 to 25% by weight, based on the total weight of the copolymer, of one or more ethylenically unsaturated monomers containing carboxyl groups.

The laminated products are lightweight, rigid, dimensionally stable and heat-resistant moldings for incorporation into motor vehicles, aircraft or watercraft, or into other machinery or household devices. The moldings are preferably used for motor vehicle construction, in particular, for incorporation into motor vehicles.

The process of the present invention can give foamed products which have good heat-resistance at temperatures of 90° C. of and above. Using the hot-melt adhesives used hitherto, or the process described in EP-A 710578 without binders, gives products with unsatisfactory heat-resistance of the adhesive bond above 80° C. The good heat-resistance of the adhesive bond according to the invention at temperatures of 80° C. and above, even when the glass transition temperature or the softening point of the copolymer concerned is markedly lower than this, was surprising and unexpected.

EXAMPLE 1

Using electrostatic spray application (application weight: about 30 g/m$^2$), a styrene-butyl acrylate copolymer containing carboxyl groups (Tg=59° C.) was applied uniformly to a glass-fiber mat (weight per unit area about 30 g/m$^2$) placed in the mold, and sintered-on for 90 sec at 180° C. The glass web treated in this way was then laminated at 120° C. and about 1.2 bar onto a foamed molding made from EPS/PPO. To test the strength of the bond, the laminated molding was stored for 1 h at 90° C. An attempt was then made to peel off the laminated glass web by hand. Result: it was now impossible to remove the glass web from the foam surface. Instead, the glass fibers were pulled away from the glass web, or foam particles from the surface of the molding, without any delamination at the glass-web/molding bond.

EXAMPLE 2

Using electrostatic spray application (application weight: about 50 g/m$^2$), a vinyl acetatevinyl chloride copolymer containing carboxyl groups (Tg =48° C.) was applied uniformly to a glass-fiber mat (weight per unit area about 47 g/m$^2$) placed in the mold, and sintered-on for 2 min. at 170° C. The glass web treated in this way was then laminated at 120° C. and about 1.2 bar onto a foamed molding made from EPS/PPO. To test the strength of the bond, the laminated molding was stored for 1 hour at 90° C. An attempt was then made to peel off the laminated glass web by hand. Result: it was now impossible to remove the glass web from the foam surface. Instead, the glass fibers were pulled away from the glass web, or foam particles from the surface of the molding, without any delamination at the glass-web/molding bond.

EXAMPLE 3

Using electrostatic spray application (application weight: about 50 g/m$^2$), a methyl methacrylate-butyl acrylate copolymer containing carboxyl groups (Tg=57° C.) was applied uniformly to a glass-fiber mat (weight per unit area about 30 g/m$^2$) and sintered-on for 2 min at 170° C. The glass web treated in this way was then placed into a suitable mold, and the PS/PPO beads to be expanded were added. The PS/PPO was then foamed onto the glass web using superheated steam. The resultant molding was removed from the mold and degassed at 80° C. for several hours. To assess strength after a change in atmospheric conditions, the laminated foam part was subjected to a total of three periods of alternating storage, in each case for a number of hours, at 90° C. and −20° C. An attempt was then made to peel off the laminated glass web by hand. Result: it was now impossible to remove the glass web from the foam surface. Instead, the glass fibers were pulled away from the glass web, or foam particles from the surface of the molding, without any delamination at the glass-web/molding bond.

COMPARATIVE EXAMPLE 1

Using electrostatic spray application (application weight: about 30 g/m$^2$), a polyethylene powder was applied uniformly to a glass-fiber mat (weight per unit area about 30 g/m$^2$) placed in the mold, and sintered-on for 90 sec at 180° C. The glass web treated in this way was then laminated at 120° C. and about 1.2 bar onto a foamed molding made from EPS/PPO. To test the strength of the bond, the laminated molding is stored for 1 h at 90° C. An attempt was then made to peel off the laminated glass web by hand. Result: the glass web could be peeled away easily from the foamed molding. The desired bond strength had therefore not been achieved.

What is claimed is:

1. A process for laminating a textile sheet material to a foamed particle molding prepared by molding foamable polymer beads, said process comprising at least one of a)–c):

a)i) applying a pulverulent solid adhesive to a textile sheet material to provide an adhesive-containing textile sheet material, and a)ii) contacting said adhesive-containing textile sheet material with a previously molded foamed particle molding, and a)iii) heating to fuse and crosslink said solid adhesive;

b)i) applying a pulverulent solid adhesive to a textile sheet material to form an adhesive-containing textile sheet material, b)ii) introducing said adhesive-containing textile sheet material into a mold, b)iii) introducing foamable polymer beads into said mold adjacent said adhesive-containing textile sheet, and b)iv) applying heat to foam said foamable polymer beads and to fuse and crosslink said solid adhesive; and c)i) applying a pulverulent solid adhesive between a previously molded foamed particle molding and a textile sheet material, and c)ii) heating to fuse and crosslink said solid adhesive, whereby said textile sheet material is adhesively bonded to said foamed particle molding, wherein said pulverulent solid adhesive comprises a copolymer of 0.01 to 25 weight percent of one or more ethylenically unsaturated monomers bearing at least one carboxyl group, and at least one monomer from the group of vinyl esters, acrylates, methacrylates, vinyl aromatics, and vinyl chloride, and wherein said pulverulent solid adhesive further comprises a pulverulent solid crosslinker.

2. The process of claim 1 wherein said process comprises steps b)i) to b)iv).

3. The process of claim 1, wherein said process comprises steps a)i) to a)iii).

4. The process of claim 1, wherein said pulverulent solid adhesive is applied to a textile sheet material and heated to sinter said pulverulent solid adhesive particles to said textile sheet material prior to steps a)ii) and/or b)ii).

5. The process of claim 1, wherein said pulverulent solid crosslinker contains two or more epoxy or isocyanate groups, said pulverulent solid crosslinker being present in an amount of 0.1 to 25% by weight based on the weight of the pulverulent solid adhesive.

* * * * *

UNITED STATES PATENT AND TRADEMARK OFFICE
CERTIFICATE OF CORRECTION

PATENT NO. : 6,428,652 B1  Page 1 of 1
DATED : August 6, 2002
INVENTOR(S) : Klaus Kolhammer et al.

It is certified that error appears in the above-identified patent and that said Letters Patent is hereby corrected as shown below:

<u>Title page, Item 54 and Column 1, lines 1-3,</u>
The Title should read as follows: -- PROCESS FOR LAMINATING TEXTILE SHEET MATERIALS ONTO MOLDABLE PARTICLE FOAM OR ONTO FOAMED MOLDINGS --

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,428,652 B1
DATED : August 6, 2002
INVENTOR(S) : Klaus Kohlhammer et al.

It is certified that error appears in the above-identified patent and that said Letters Patent is hereby corrected as shown below:

Title page,
Item [12], United States Patent, "Kalhammer et al." should read
-- Kohlhammer et al. --;
Item [75], Inventors, "Klaus "Kolhammer" should read -- Klaus Kohlhammer --.

Signed and Sealed this

Twenty-seventh Day of January, 2004

JON W. DUDAS
*Acting Director of the United States Patent and Trademark Office*